United States Patent [19]

Prochut et al.

[11] Patent Number: 5,560,471
[45] Date of Patent: Oct. 1, 1996

[54] APPARATUS FOR TRANSFERRING CONTAINERS TO A MOVING CONVEYOR

[75] Inventors: Richard Prochut, Bartlett; Doug Sarrazine, Sr., Palatine, both of Ill.

[73] Assignee: Tetra Laval Holdings & Finance S. A., Pully, Switzerland

[21] Appl. No.: 315,404

[22] Filed: Sep. 28, 1994

[51] Int. Cl.⁶ .................................................. B65G 47/26
[52] U.S. Cl. .......................... 198/433; 198/448; 198/395
[58] Field of Search ..................................... 198/430, 433, 198/395, 448

[56] References Cited

U.S. PATENT DOCUMENTS

| | | |
|---|---|---|
| 732,221 | 6/1903 | Potvin . |
| 1,872,686 | 8/1932 | Cundall . |
| 2,470,795 | 5/1949 | Socke . |
| 2,630,951 | 3/1953 | Slightam . |
| 2,744,610 | 5/1956 | Stiles ........................................ 198/433 |
| 2,822,079 | 2/1958 | Ascani . |
| 2,827,148 | 3/1958 | Engleson et al. . |
| 2,827,159 | 3/1958 | Peteler . |
| 2,954,881 | 10/1960 | Hopton et al. . |
| 3,051,292 | 8/1962 | Sundquist et al. . |
| 3,067,851 | 12/1962 | O'Rourke, Jr. . |
| 3,179,231 | 4/1965 | Craig ........................................ 198/433 |
| 3,308,922 | 3/1967 | Ellis et al. ................................ 198/433 |
| 3,360,100 | 12/1967 | Seragnoli . |
| 3,388,815 | 6/1968 | Lingl . |
| 3,433,966 | 3/1969 | Letch et al. ............................. 198/395 |
| 3,774,370 | 11/1973 | Fried . |
| 3,854,602 | 12/1974 | Blank . |
| 3,923,144 | 12/1975 | Langen . |
| 4,299,134 | 10/1980 | Reist . |
| 4,413,720 | 11/1983 | Pfleger .................................... 198/433 |
| 4,610,347 | 9/1986 | Inoko . |
| 4,617,778 | 10/1986 | Blackman . |
| 4,768,642 | 9/1988 | Huntger . |
| 5,004,093 | 4/1991 | Blezard . |
| 5,044,488 | 9/1991 | Bolin ...................................... 198/430 |
| 5,133,446 | 7/1992 | Draghetti . |

FOREIGN PATENT DOCUMENTS 356874   9/1931   United Kingdom .

*Primary Examiner*—Joseph E. Valenza
*Attorney, Agent, or Firm*—McAndrews, Held & Malloy, Ltd.; Patrick N. Burkhart

[57] ABSTRACT

A mechanism is provided for simultaneously transferring a plurality of containers onto a continuously moving conveyor from a surface located adjacent to the conveyor. A pair of pusher plates are positioned along the surface, opposite the conveyor. The pusher plates extend towards the conveyor to simultaneously transfer a predetermined number of containers onto the conveyor. A shuttle plate is positioned above the conveyor and has compartments positioned to receive the cartons as they are pushed onto the conveyor. Once the cartons are loaded into the compartments, the shuttle plate is moved along the conveyor to accelerate the batch of containers up to the speed of the conveyor. Once the cartons reach the speed of the conveyor, the shuttle plate retracts out of the path of the conveyor and the containers continues to move along the conveyor. The shuttle plate then returns to its original to accept the next batch of containers.

33 Claims, 8 Drawing Sheets

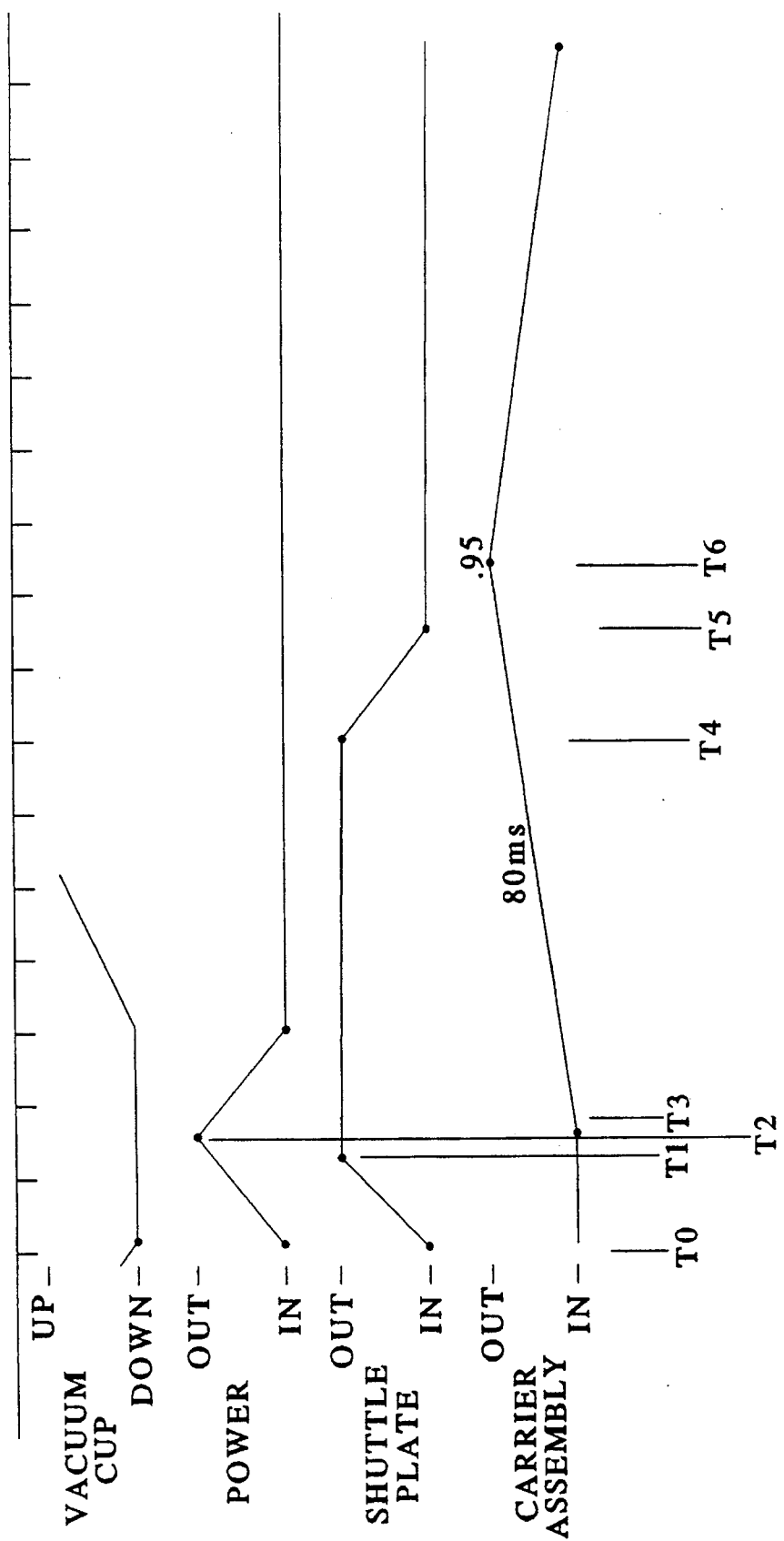

APPARATUS FOR TRANSFERRING CONTAINERS TO A MOVING CONVEYOR

TECHNICAL FIELD

The present invention relates to a material handling apparatus. More specifically, the present invention relates to an apparatus for simultaneously transferring a plurality of containers onto a continuously moving outfeed conveyor.

BACKGROUND

In the packaging industry it is often necessary to transfer containers, packages and/or goods onto a moving conveyor. For example, it may be necessary to transfer filled cartons from a packaging machine onto an outfeed conveyor which then routes the containers to other locations in the packaging facility. Typically, containers are laterally loaded onto the conveyor by a mechanism which pushes them onto the conveyor from the side. One such device is illustrated in U.S. Pat. No. 4,617,778 to Blackman. Such a design is problematic because the containers often tip over when they are transferred to the moving conveyor. If the containers tip over they can jam the line, causing undesirable downtime for the packaging operation.

It is also known to provide conveyors with baskets or compartments configured to receive a preselected number of the transferred items and maintain the items in the desired orientation on the conveyor. Examples of these devices are illustrated in U.S. Pat. No. 4,768,642 to Hunter and U.S. Pat. No. 2,827,148 to Engleson et al. Although such designs can reduce the chance of container tipping, they are undesirable because the conveyors must be specifically configured to receive the transferred item. In addition, such designs increase the difficulty of timing transfer of the item onto the conveyor.

Another approach is to employ indexing or intermittently operating conveyors. A system employing intermittent conveyors is described in U.S. Pat. No. 5,004,093 to Blezard. Indexing conveyors are undesirable because they reduce the throughput time of the operation.

SUMMARY OF THE INVENTION

An apparatus is provided for transferring a plurality of containers from a support surface to a continuously moving conveyor located adjacent to the support surface. The apparatus includes a pusher mechanism for simultaneously pushing a plurality of the containers from the support surface and onto the conveyor. A shuttle mechanism receives the containers as they are pushed onto the conveyor and accelerates the cartons along the conveyor until they are traveling at approximately the same speed as the conveyor.

In accordance with one embodiment, the pusher mechanism includes at least one pusher plate positioned adjacent to the support surface, opposite the conveyor. The pusher plate is movable in a direction transverse to the conveyor between a retracted position and an extended position to simultaneously transfer a plurality of containers onto the conveyor. A pneumatic cylinder moves the pusher plate between its extended and retracted positions. The shuttle mechanism includes a shuttle plate having a plurality of compartments arranged to receive the containers as they are loaded onto the conveyor by the pusher plate. The shuttle plate is movable along a first axis running parallel to the conveyor between a first position opposite the pusher plates and a second position downstream of the pusher plates. The shuttle plate is also movable along a second axis running perpendicular to the conveyor between an extended position at which the shuttle plate is positioned above the conveyor and a retracted position at which the shuttle plate is laterally spaced from the conveyor. A pair of pneumatic cylinders move the shuttle plate along the first and second axis.

Other objects and advantages of the present invention will become apparent upon reference to the accompanying detailed description when taken in conjunction with the following drawings.

BRIEF DESCRIPTION OF THE DRAWINGS

FIG. 8 is a timing chart that can be used in the control system of FIG. 7.

DETAILED DESCRIPTION OF THE PREFERRED EMBODIMENTS

Figure 1:
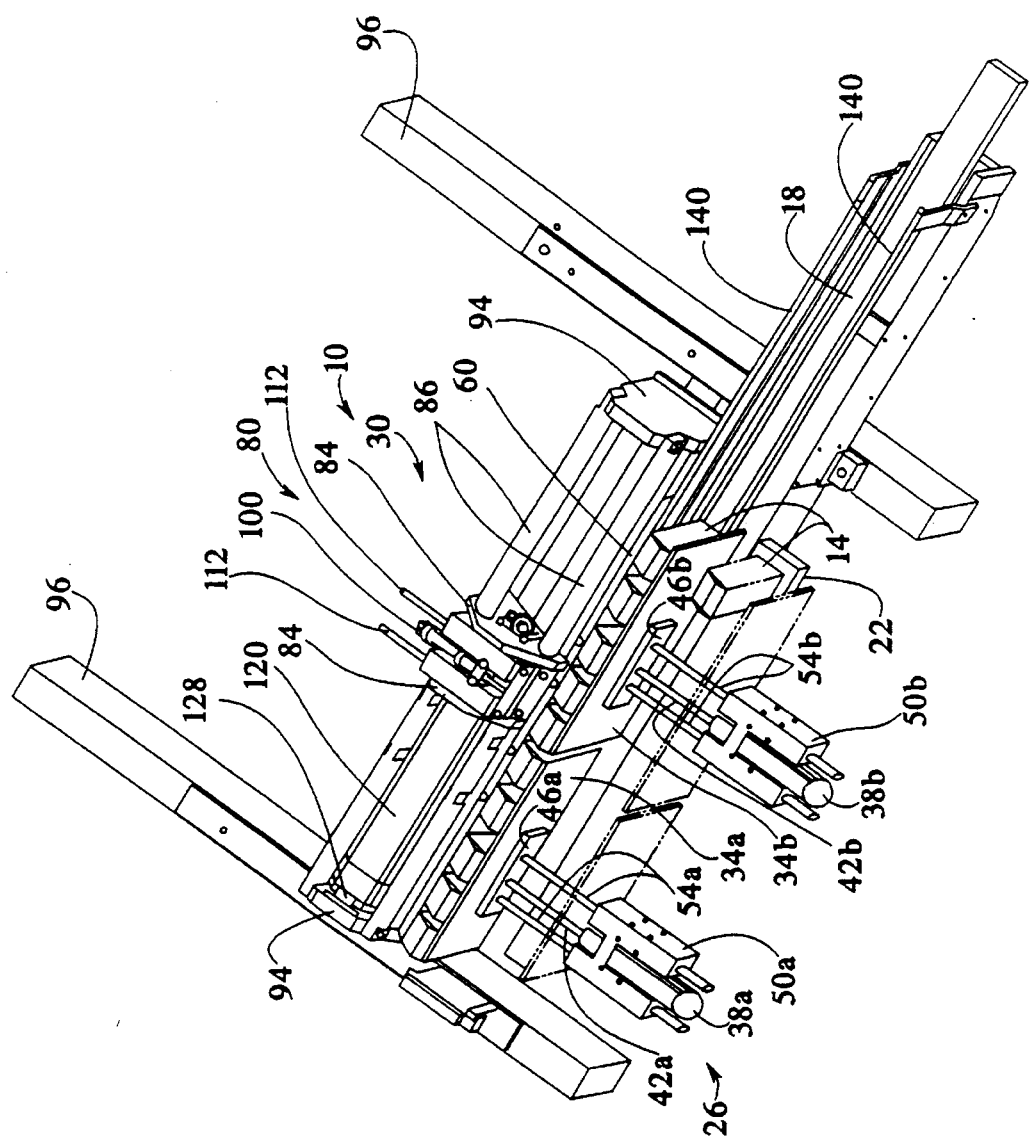
FIG. 1 is a from perspective view of a transfer mechanism for loading containers onto a moving conveyor.
Figure 2:
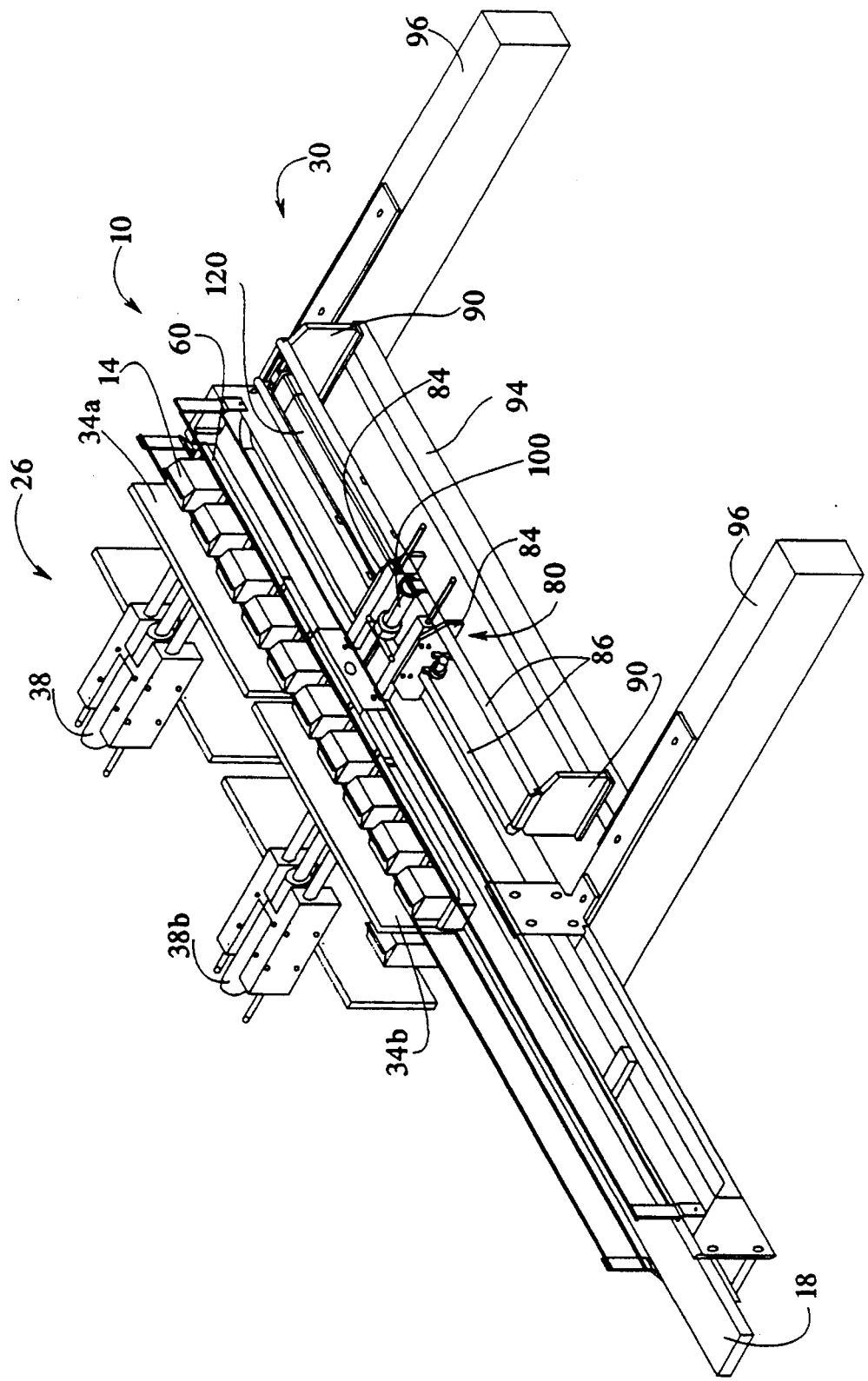
FIG. 2 is a rear perspective view of the transfer mechanism.

A transfer mechanism 10 for loading containers onto a moving conveyor is generally illustrated in FIGS. 1 and 2. The transfer mechanism 10 may be used, for example, to load cartons 14 from a packaging machine (not shown) onto an endless conveyor 18 which then routes the cartons 14 to preselected locations in the packaging facility. It should be appreciated, however, that the transfer mechanism 10 can readily be adapted for other applications in which it is necessary to transfer items, including containers, packages and raw materials, onto a moving conveyor.

The packaging machine includes a movable support, in the form of a vacuum cup 22 which is more fully described in U.S. application Ser. No. 08/315,403, entitled "Vacuum Cup Bottom Former", filed on even date herewith, the disclosure of which is hereby incorporated by reference. The cartons 14 are carried in holders (not shown) arranged in a row along the top face of the vacuum cup 22. The vacuum cup 22 moves vertically along a pair of guide arms (not show) between a raised position (not shown) and a lowered position (See FIG. 1) at which the vacuum cup 22 is positioned adjacent to the conveyor 18. When the vacuum cup 22 reaches its lowered position, pistons (not shown) move upwardly in the holders to eject the cartons 14 from the holders.

Once the cartons 14 are ejected from the holders, the transfer mechanism 10 loads the cartons 14 onto the moving conveyor 18. For this purpose, the transfer mechanism 10 includes a pusher mechanism 26 and a shuttle mechanism 30. The pusher and shuttle mechanisms 26, 30 are mounted on the packaging machine base (not shown) which maintains their orientation relative to one another, and relative to the vacuum cup 22 and the outfeed conveyor 18. The pusher mechanism 26 is adapted to simultaneously transfer a predetermined number of cartons 14 from the vacuum cup 22 to the conveyor 18. For this purpose, the pusher mechanism 26 includes first and second pusher plates 34a, 34b positioned to align with the cartons 14 when the vacuum cup 22 is at its lowered position. It should be appreciated, however, that a single pusher plate could be used in the transfer mechanism.

The pusher plates 34a, 34b are movable in a direction transverse to the conveyor 18 between a retracted position distally located from the conveyor 18 and an extended position proximal to the conveyor 18. In FIGS. 1 and 2, the pusher plates 34a, 34b are shown at their retracted position in broken lines and their extended position in solid lines. As the pusher plates 34a, 34b move from their retracted position to their extended position, they travel across the vacuum cup 22, simultaneously transferring a plurality of cartons 14 onto the conveyor 18. Each pusher plate 34a, 34b has a width W (See FIG. 3) which is approximately one-half the width of the support, so that each pusher plate 34a, 34b "pushes" one-half of the cartons 14 carried by the vacuum cup 22.

A pair of pneumatic cylinders 38a, 38b have their piston rods 42a, 42b rigidly connected to the back of a respective pusher plate 34a, 34b by mounting brackets 46a, 46b. Pressurized air is controllably delivered to the pneumatic cylinders 38a, 38b from an external source (not shown) to drive the piston rods 42a, 42b, and hence the pusher plates 34a, 34b, between the retracted and extended positions. The pneumatic cylinders 38a, 38b are double acting air cylinders, as are well known in the art. Each pneumatic cylinder 38a, 38b includes a solenoid operated valve responsive to a control signal for regulating the flow of pressurized air to the cylinder. A system for producing the control signals is explained in greater detail below in connection with FIG. 7. Each pneumatic cylinder 38a, 38b further includes a manually adjustable flow control valve (not shown) for regulating the flow of exhaust air from the cylinder, thereby allowing adjustment of the speed at which the piston rods 42a, 42b travel. The pneumatic cylinders 38a, 38b are mounted in bushings 50a, 50b which are rigidly connected to the base of the packaging machine by mounting brackets (not shown). A pair of guide rods 54a, 54b are slidably mounted in each bushing 50a, 50b and extend parallel to a respective piston rod 42a, 42b. The ends of the guide rods 54a, 54b are connected to the brackets 46a, 46b to support the pusher plates 34a, 34b as they move between their retracted and extended positions. The pneumatic cylinders 38, guide rods 54 and bushings 50 are all commercially available from Mecman. Other commercial components are likewise suitable for such use, as are other types of devices such as servo motors.

Figure 3:
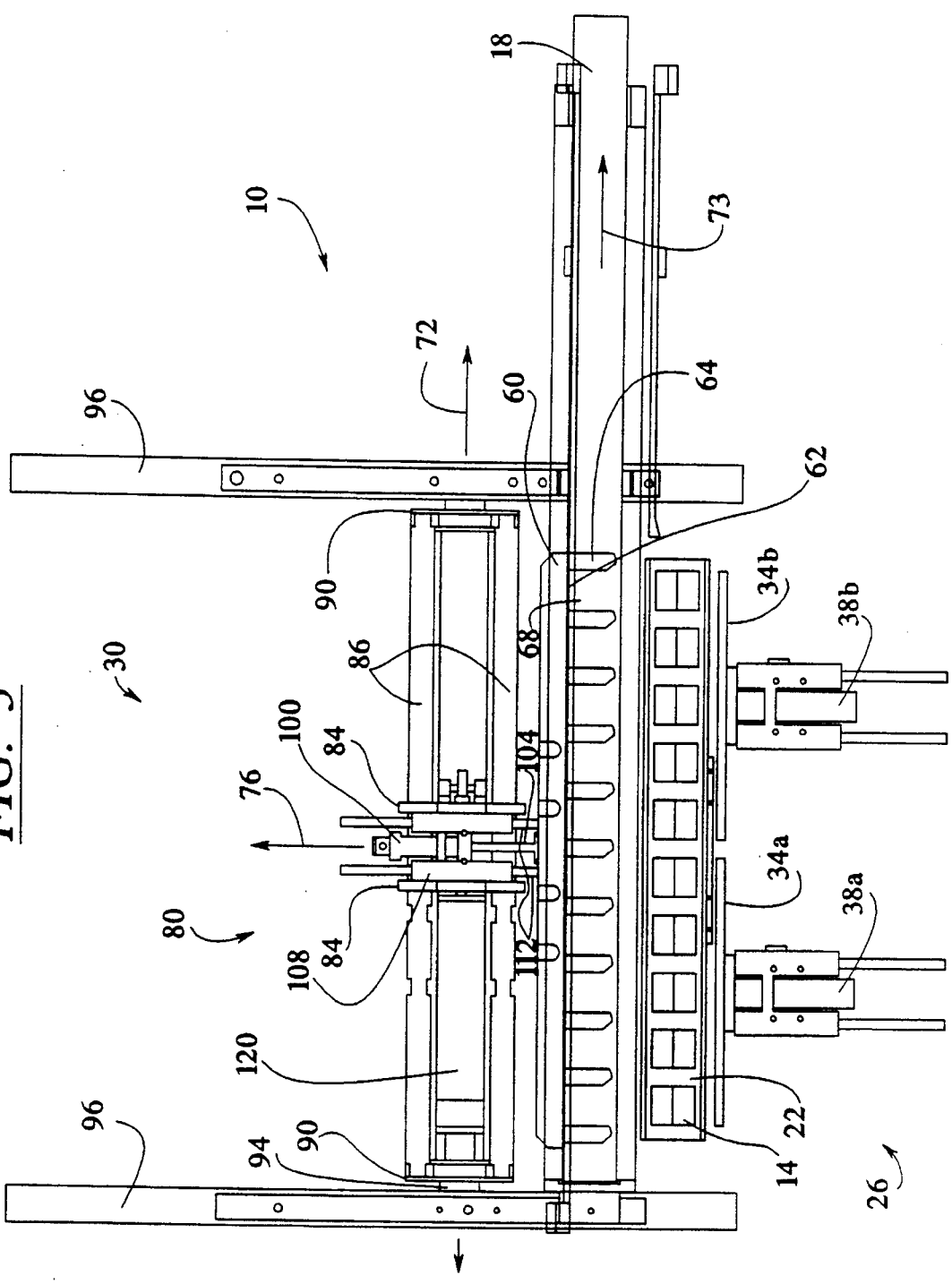
FIG. 3 is a top view of the transfer mechanism illustrating the pusher plates and shuttle plate positioned to load a batch of cartons onto the conveyor.
Figure 4:
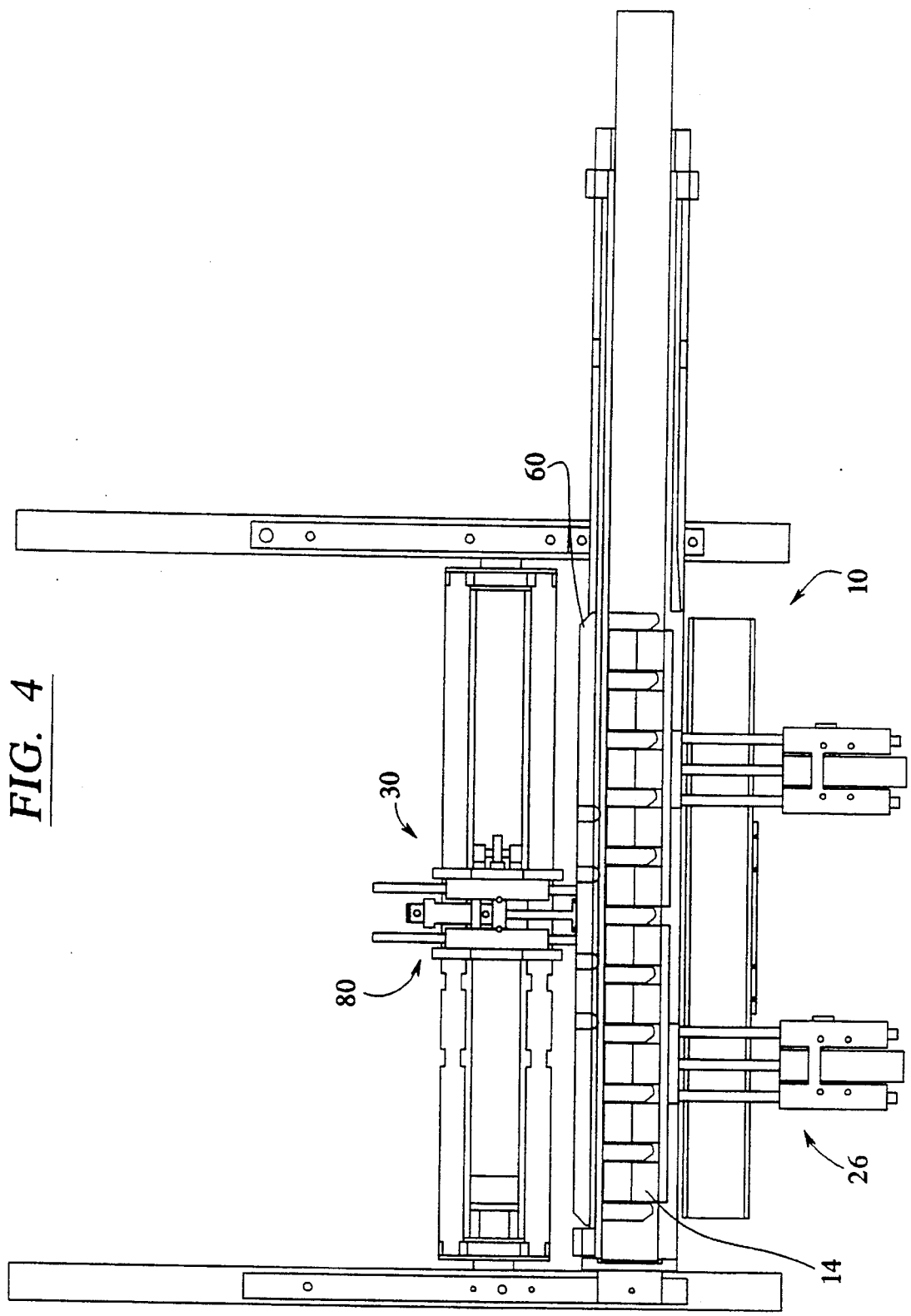
FIG. 4 is a top view of the transfer mechanism illustrating the pusher plates loading the cartons into the shuttle plate.

As can best be seen in FIG. 3, the shuttle mechanism 30 includes a shuttle plate 60 which is positionable to receive the cartons 14 as they are pushed onto the conveyor 18. The shuttle plate 60 has a plurality of fingers 64 which extend towards the pusher plates 34a, 34b. The fingers are evenly spaced along the front face 62 of the shuttle plate 60 and define a plurality of compartments 68, each of which is sized to receive one of the cartons 14. The compartments 68 support the cartons 14, preventing them from tipping over when they are pushed onto the moving conveyor 18.

Figure 6:
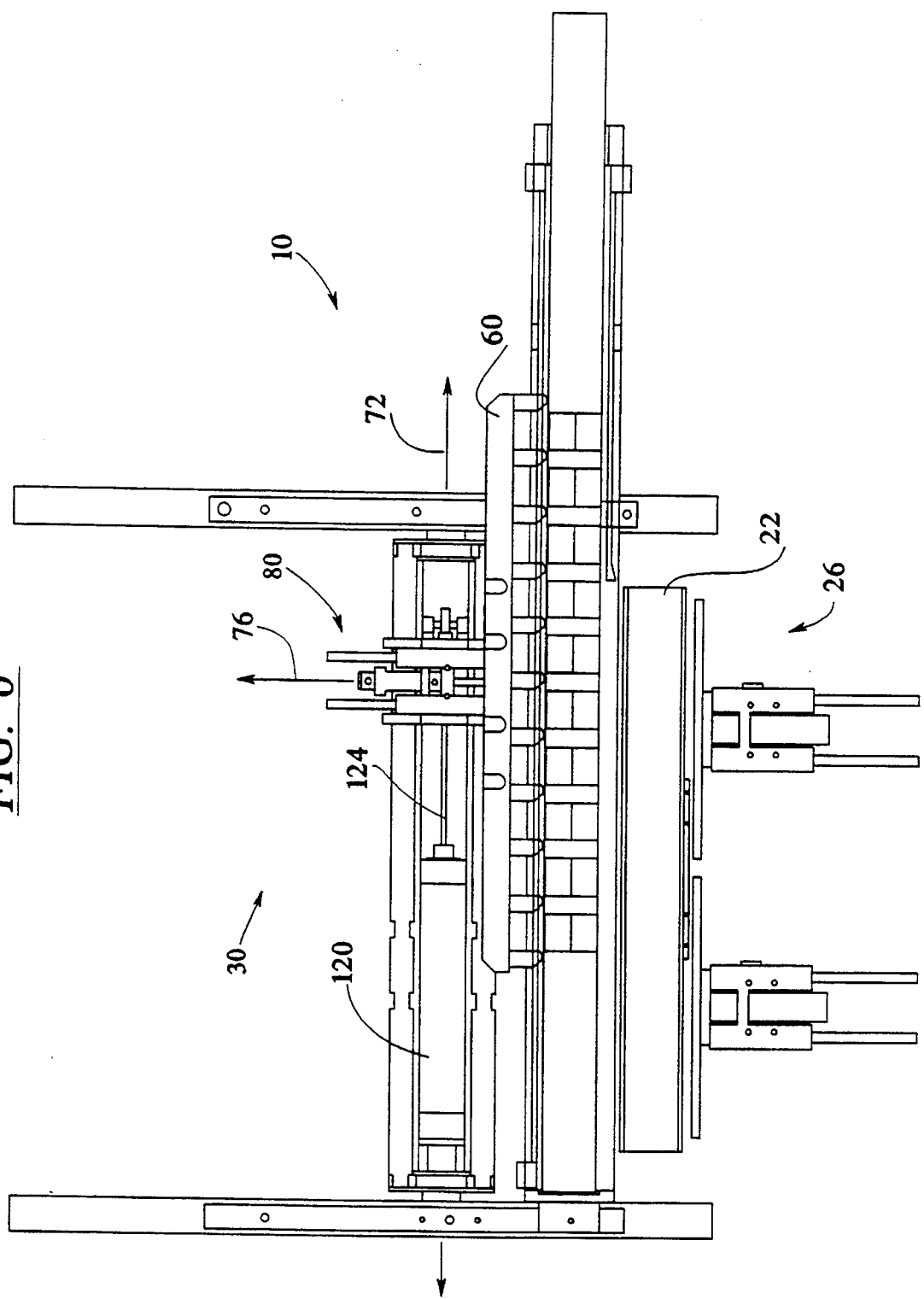
FIG. 6 is a top view of the transfer mechanism, as positioned in FIG. 5.

The shuttle plate 60 is movable along first axis 72 running parallel to the conveyor 18 between a first position (See, e.g., FIG. 3) opposite the pusher plates 34a, 34b and a second position (See, e.g., FIG. 6) located downstream from the pusher plates. As the shuttle plate 60 moves from the first position to the second position, it travels in the conveyor's direction of travel, as indicated by the arrow 73. The shuttle plate 60 is also movable along a second axis 76 running perpendicular to the conveyor 18. The shuttle plate 60 moves along the second axis 76 between an extended position (See, e.g., FIG. 3) at which the shuttle plate is positioned above the conveyor and a retracted position (See, e.g., FIG. 6) at which the shuttle plate is laterally spaced from the conveyor on the side opposite the pusher plates 34a, 34b.

The shuttle plate 60 is connected to a carrier assembly 80 which is adapted to move the shuttle plate along its first and second axis 72, 76. As is shown in FIGS. 2 and 3, the carrier assembly 80 has a pair of parallel end plates 84, each of which is slidably connected to a pair of guide rails 86. The guide rails 86 extend parallel to the first axis 72 and are supported by support members 90 positioned at opposite ends of the guide rails 86. The support members 90 are in turn supported by a longitudinal member 94 extending between a pair of spaced apart transverse members 96 which may, for example, form a portion of the packaging machine base.

A third pneumatic cylinder 100, which is generally similar to those described above, is mounted in the carrier assembly 80 for movement with the carrier assembly along the first axis 72. The piston rod 104 of the pneumatic cylinder 100 extends along the second axis 76 and is rigidly connected to the back of the shuttle plate 60 for moving the shuttle plate along the second axis between its retracted and extended positions. The pneumatic cylinder 100 includes a solenoid operated valve adapted to receive a control signal and regulate the flow of pressurized air to the pneumatic to control movement of the piston rod 104. A bushing 108 connects the pneumatic cylinder 100 to the carrier assembly 80. A pair of guide rods 108, running parallel to the piston rod 104, are slidably mounted in the bushing 112. The ends of the guide rods 108 are connected to the back of the shuttle plate 60 to further support the shuttle plate 60.

Figure 5:
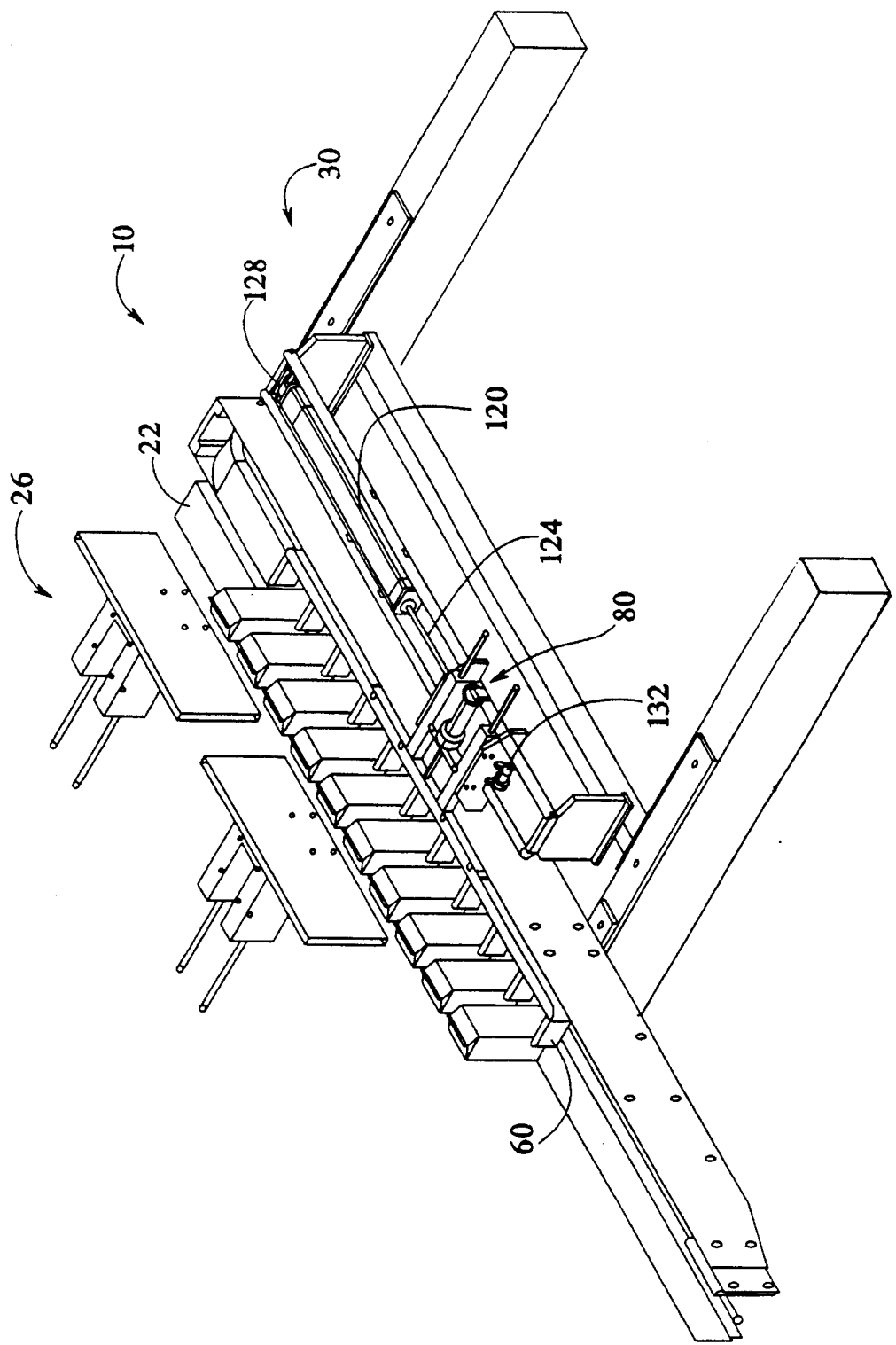
FIG. 5 is a rear perspective view of the transfer mechanism showing the carrier assembly at its second position and the shuttle plate at its retracted position.

A fourth pneumatic cylinder 120 is connected to move the carrier assembly 80, and hence the shuttle plate 60, along the first axis 72. The fourth pneumatic cylinder 120 is mounted between the guide rails 86 with its piston rod 124 extending parallel to the guide rails. (See, e.g., FIG. 6). The closed end of the cylinder 120 is connected to one of the support members 94 via a connecting bracket 128. (See FIG. 5). Similarly, the extending end of the piston rod 124 is connected to one of carrier assembly end plates 84 via second connecting bracket 132 (See FIG. 5). The fourth pneumatic cylinder 120 has solenoid operated valve adapted to receive a control signal and responsively regulate the flow of pressurized air to control the position of the piston rod 124. Movement of the piston rod 124 to its retracted position moves the carrier assembly 80, and hence the shuttle plate 60, to the first position. Movement of the piston rod 124 to its extended position drives the carrier assembly 80 and the shuttle plate 60 to the second position.

Figure 7:
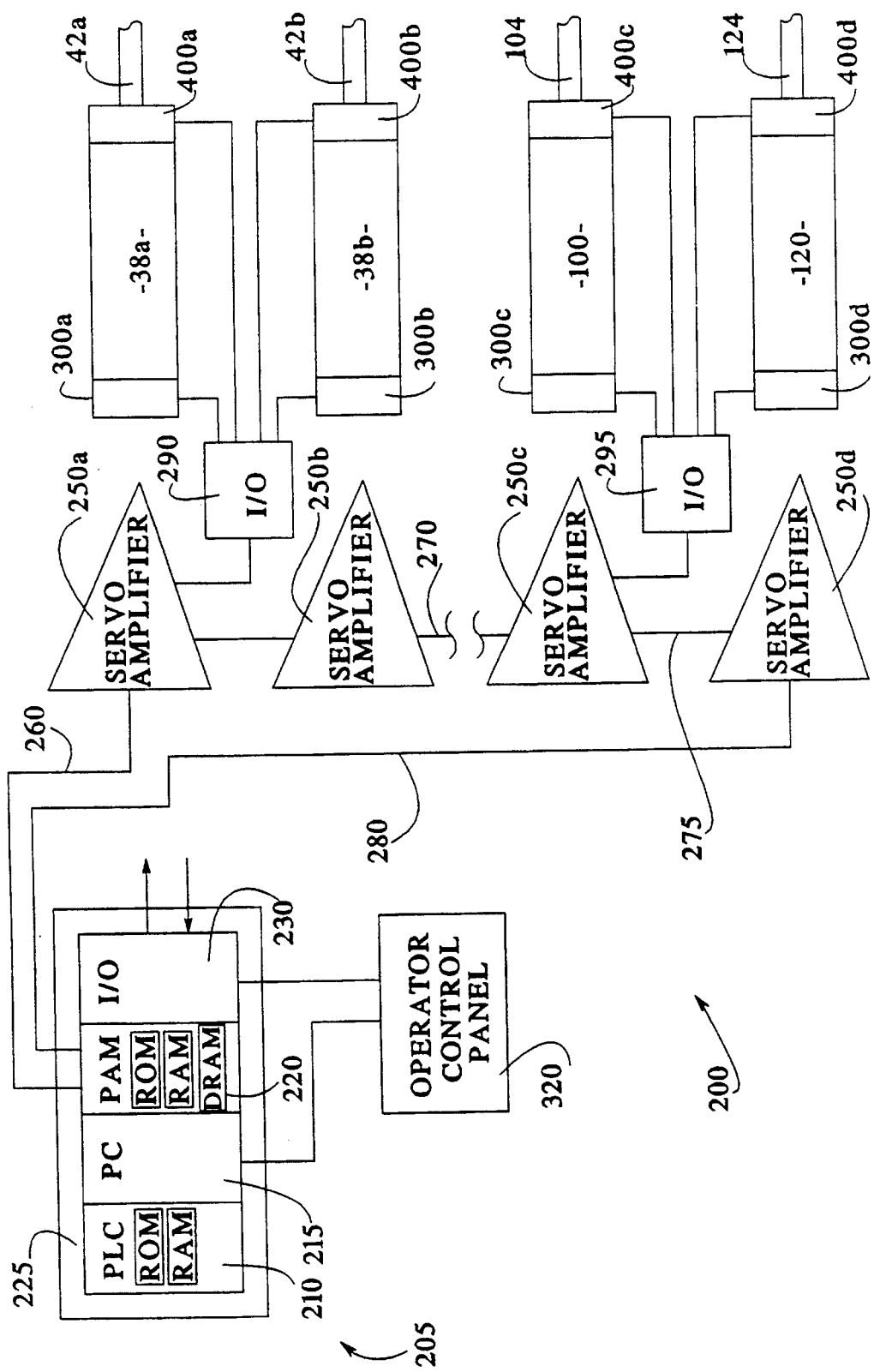
FIG. 7 is a schematic block diagram of one type of control system for controlling operation of the transfer mechanism.

FIG. 7 is a schematic block diagram illustrating one embodiment of a control system suitable for controlling operation of the pneumatic cylinders 38a, 38b, 100, 120. The control system 200 includes a programmable electronic control 205, as is described in greater detail in U.S. application Ser. No. 08/315,414, entitled "Control System for a Packaging Machine," filed even date herewith, the disclosure of which is hereby incorporated by reference. The electronic control 205 includes a programmable logic controller ("PLC") 210, an industrial PC 215, and a programmable axis manager ("PAM") 220, all of which are connected for communication with one another in a VME bus rack 225. The control system 200 components may be selected from any number of commercially available products, the specific interconnection being dependent on the products selected and, further being within the skill of those familiar with such servocontrol systems. For example, he PLC 210 may be a Model 9070 manufactured by GM Funac. The PAM 220 may be, for example, a PAM available from GE Fanuc.

The electronic control 205 is connected via an input/output ("I/O") interface unit 230 to communicate control signals to various components throughout the packaging machine. The PAM 220, in particular, is connected to a plurality of servo amplifiers 250a–250d via respective lines 260–280 that may, for example, be an optical ring network. The servo amplifiers 250a–250d are in turn connected to control servomotors (not shown) that drive various other mechanisms within the packaging. The servo amplifiers 250a–250d may be, for example, Model ST-1 amplifiers available from Socapel. Where an ST-1 servo amplifier is utilized, the servo amplifier may include an I/O card respectively associated therewith. The solenoid operated valves 300a–300d in different ones of the pneumatic cylinders 38a, 38b, 100, 120 may be operated through I/O cards 290, 295 associated with the servo amplifiers 250a and 250c. In the alternative, the solenoid operated valves 300a–300d could be directly connected to the electronic control 205 through the I/O interface unit 230. The PAM 220 receives instructions from the PLC 210 to activate the pneumatic cylinder 38 in accordance with a predetermined sequence to effect transfer of the cartons 14 from the vacuum cup 22 to the conveyor 18.

The operation cycle of the transfer mechanism 10 will now be described with reference to the timing diagram shown in FIG. 8, along with reference to FIGS. 1–6 which illustrate the transfer mechanism at different stages during the operation cycle. Initially, when the vacuum cup 22 reaches its lowered position, the pusher plates 34a, 34b are at their retracted position and the carrier assembly 80 is located at its first position with the shuttle plate 60 retracted. At time T0, the pusher plates 34a, 34b begin moving towards their extended position and the shuttle plate 60 begins moving along the second axis 76 towards its extended position. As the pusher plates 34a, 34b move across the vacuum cup 22, they engage the row of cartons and move the cartons towards the conveyor 18. The shuttle plate 60 reaches its extended position (See FIG. 3) at time T1, and the pusher plates 34a, 34b reach their extended position (See FIG. 4) at time T2. At this time, the shuttle plate 60 is positioned so that the cartons 14 are loaded into the compartments 68 as they are pushed onto the conveyor 18.

Once the cartons 14 are loaded into the shuttle plate 60, the fourth pneumatic cylinder 120 extends at time T3 to move carrier assembly 80 and the shuttle plate 60 along the first axis 72 towards the second position. As the carrier assembly 80 moves towards the second position, it moves in the conveyor's direction of travel, accelerating to a speed which is approximately the same as the speed of the conveyor 18. At time T4, subsequent to the shuttle plate 60 reaching the speed of the conveyor 18, the third pneumatic cylinder 100 begins retracting the shuttle plate 60 along the second axis 76. The shuttle plate 60 is fully retracted from the cartons 14 at time T5. (See FIGS. 5 and 6). Guide rails 140 on the conveyor 18 support the containers 14 from lateral displacement while the shuttle plate 60 is being retracted. (See FIG. 1). At time T6, after the shuttle plate 60 is fully retracted, the carrier assembly 80 begins to move to its first position to receive another batch of cartons 14.

Returning now to FIG. 7, the electronic control 205 may also be connected to control the operation of a video monitor on an operator control panel 320 that communicates machine status information to the user. For example, the electronic control 205 is programmed to monitor the absolute position of the piston rods 42a, 42b, 104, 124 in the various pneumatic cylinders 38a, 38b, 100, 120 to verify that the transfer mechanism is operating properly. For this purpose, each pneumatic cylinder 38a, 38b, 100, 120 is equipped with an absolute position sensor 400a–400d adapted to detect the position of a respective piston rod 42a, 42b, 104, 124 and responsively produce an electrical signal which is transmitted to the electronic control 205 via the I/O cards 290, 295. Alternatively, the position sensors 400a–400d could be connected to the electronic control 205 through the I/O interface unit 230.

The electronic control 205 is programmed to check the position of different ones of the piston rods 42a, 42b, 104, 124 at predetermined times during each operating cycle. If a piston rod 42a, 42b, 104, 124 is not at the correct location when it is checked, it is assumed that a malfunction has occurred. One cause for such a malfunction can be tipped containers blocking movement of the transfer mechanism components. If a malfunction is detected, the electronic control 205 is programmed to shut down the packaging machine and/or communicate a fault code or message to the operator control panel 320.

Although the present invention has been described with reference to a specific embodiment, those of skill in the art will recognize that changes may be made thereto without departing from the scope and spirit of the invention as set forth in the appended claims.

We claim as our invention:

1. An apparatus for transferring a plurality of containers from a support surface to a continuously moving conveyor located adjacent to the support surface, comprising:
   a) pusher means for simultaneously pushing a plurality of the containers from the support surface and onto the conveyor; and
   b) shuttle means for receiving the containers as they are pushed onto the conveyor by the pusher means and accelerating the cartons along the conveyor until the cartons are traveling at approximately the same speed as the conveyor the shuttle means comprising
      a shuttle plate having a plurality of compartments arranged to receive the containers as they are loaded onto the conveyor by the pusher means, the shuttle plate being movable along a first axis running parallel to the conveyor between a first position opposite the pusher plates and a second position downstream of the pusher plate, the shuttle plate also being movable along a second axis running perpendicular to the conveyor between an extended position at which the shuttle plate is positioned above the conveyor and a retracted position at which the shuttle plate is laterally spaced from the conveyor on the side opposite the pusher plate;
      at least one guide rail extending parallel to the first axis;
      a carrier assembly slidably mounted on the guide rail for movement along the first axis;
      a first pneumatic cylinder mounted on the carrier assembly for movement therewith, the first pneumatic cylinder being connected to move the shuttle plate along the second axis, between its extended and retracted positions; and a second pneumatic cylinder connected to move the carrier assembly along the first axis, between its first and second positions.

2. An apparatus as set forth in claim 1, wherein said pusher means comprises:
   a) at least one pusher plate positioned adjacent to the support surface, opposite the conveyor, the pusher plate being movable in a direction transverse to the conveyor between a retracted position and an extended position; and
   b) means for moving the pusher plate between its retracted and extended position.

3. An apparatus as set forth in claim 1, wherein the means for moving the pusher plate comprises a pneumatic cylinder connected to move the pusher plate between its retracted and extended positions.

4. An apparatus as set forth in claim 3 wherein the means for moving the pusher plate further comprises a programmable electronic control connected to control operation of the pneumatic cylinder.

5. An apparatus as set forth in claim 1, wherein the shuttle means further comprises a programmable electronic control connected to control operation of the first and second pneumatic cylinders.

6. An apparatus as set forth in claim 1 further comprising a means for detecting an obstruction during transfer between the support surface and the conveyor.

7. An apparatus as set forth in claim 1 including two pusher plates.

8. An apparatus as set forth in claim 1, wherein the compartments are defined by a plurality of fingers extending from the shuttle plate in a direction transverse to the conveyor.

9. An apparatus for transferring a plurality of containers from a support surface to a continuously moving conveyor located adjacent to the support surface, comprising:
   a) at least one pusher plate positioned to engage the cartons on the support surface, the pusher plate being movable along an axis extending transverse to the conveyor between a retracted position distal from the conveyor and an extended position proximal to the conveyor;
   b) a first pneumatic cylinder connected to move the pusher plate between its extended and retracted positions to simultaneously push a plurality of the containers from the support surface and onto the conveyor;
   c) a shuttle plate having a plurality of compartments arranged to receive the containers as they are loaded onto the conveyor by the pusher means, the shuttle plate being movable along a first axis running parallel to the conveyor between a first position opposite the pusher plate and a second position downstream of the pusher plate, the shuttle plate also being movable along a second axis running perpendicular to the conveyor between an extended position at which the shuttle plate is positioned above the conveyor and a retracted position at which the shuttle plate is laterally spaced from the conveyor on the side opposite the pusher plate;
   d) at least one guide rail extending parallel to the first axis;
   e) a carrier assembly connected to the shuttle plate, the carrier assembly being slidably mounted on the guide rail for movement along the first axis;
   f) a second pneumatic cylinder mounted on the carrier assembly for movement therewith, the second pneumatic cylinder being connected to move the shuttle plate along the second axis, between the extended and retracted positions; and
   g) a third pneumatic cylinder connected to the carrier assembly to move the carrier assembly along the first axis, between the first and second positions to thereby facilitate movement of the shuttle plate along its first and second axis in accordance with a predetermined sequence to accelerate the containers along the conveyor until the containers are traveling at approximately the same speed as the conveyor.

10. An apparatus as set forth in claim 7, and further comprising a programmable electronic control connected to control operation of the first pneumatic cylinder.

11. An apparatus as set forth in claim 9, further comprising a programmable electronic control connected to control operation of the pneumatic cylinders.

12. An apparatus as set forth in claim 9, further comprising means for detecting an obstruction during transfer between the support surface and the conveyor.

13. An apparatus for transferring a plurality of containers from a support surface to a continuously moving conveyor located adjacent to the support surface, comprising:
   pusher means for simultaneously pushing a plurality of the containers from the support surface and onto the conveyor; and
   a shuttle assembly means for receiving the containers as they are pushed onto the conveyor by the pusher means, the shuttle assembly having a plurality of compartments arranged to receive the containers as they are loaded onto the conveyor by the pusher means, the shuttle assembly being movable along a first axis that is generally transverse to the conveyor between a first position at which it engages containers on the conveyor and a second position at which it disengages from the containers on the conveyor;
   at least one guide member disposed along a second axis that is generally parallel to the conveyor, the shuttle assembly being slidable along the guide member from a first position opposite the pusher means and a second position downstream of the pusher means.

14. An apparatus as claimed in claim 13 wherein said shuttle assembly means comprises means for moving the shuttle assembly between the first position and the second position along the first axis and between the first position and the second position along the second axis.

15. An apparatus as claimed in claim 14, wherein the means for moving comprises:
   a first pneumatic cylinder mounted on the shuttle assembly for movement therewith, the first pneumatic cylinder being connected to move the shuttle assembly along the first axis; and
   a second pneumatic cylinder connected to move the shuttle assembly along the second axis.

16. An apparatus as claimed in claim 14, wherein the means for moving moves the shuttle assembly to accelerate the containers along the second axis to a speed approximately equal to the conveyor speed.

17. An apparatus as claimed in claim 14, wherein the means for moving comprises a programmable control system connected to actuate a first linear actuator to move the shuttle assembly along the first axis and a second linear actuator to move the shuttle assembly along the second axis.

18. An apparatus as set forth in claim 17, wherein said pusher means comprises:
   a) at least one pusher plate forming the face portion positioned adjacent to the support surface, opposite the conveyor, the pusher plate being movable in a direction transverse to the conveyor between a retracted position and an extended position; and b) means for moving the pusher plate between its retracted and extended position.

19. An apparatus as set forth in claim 17, wherein the means for moving the pusher plate comprises a pneumatic cylinder connected to move the pusher plate between its extended and retracted positions.

20. An apparatus as set forth in claim 19 wherein the means for moving the pusher plate further comprises a programmable electronic control connected to control operation of the pneumatic cylinder.

21. An apparatus for transferring a plurality of containers from a support surface to a continuously moving conveyor located adjacent to the support surface, comprising:
   a) pusher means for simultaneously pushing a plurality of the containers from the support surface and onto the conveyor, the pusher means having a face portion; and
   b) shuttle means for receiving the containers as they are pushed onto the conveyor by the pusher means and accelerating the cartons along the surface of the face portion and along the conveyor until the cartons are traveling at approximately the same speed as the conveyor.

22. An apparatus as set forth in claim 21, wherein the shuttle means comprises:
   a) a shuttle plate having a plurality of compartments arranged to receive the containers as they are loaded onto the conveyor by the pusher means, the shuttle plate being movable along first axis running parallel to the conveyor between a first position opposite the pusher plates and a second position downstream of the pusher plate, the shuttle plate also being movable along a second axis running perpendicular to the conveyor between an extended position at which the shuttle plate is positioned above the conveyor and a retracted position at which the shuttle plate is laterally spaced from the conveyor on the side opposite the pusher plate; and
   b) means for moving the shuttle plate along its first and second axis.

23. An apparatus as set forth in claim 22, wherein the means for moving the shuttle plate comprises:
   a) at least one guide rail extending parallel to the first axis;
   b) a carrier assembly slidably mounted on the guide rail for movement along the first axis;
   c) a first pneumatic cylinder mounted on the carrier assembly for movement therewith, the first pneumatic cylinder being connected to move the shuttle plate along the second axis, between its extended and retracted positions; and
   d) a second pneumatic cylinder connected to move the carrier assembly along the first axis, between its first and second positions.

24. An apparatus as set forth in claim 23, wherein the means for moving the pusher plate further comprises a programmable electronic control connected to control operation of the first and second pneumatic cylinders.

25. An apparatus as set forth in claim 21, further comprising a means for detecting an obstruction during transfer between the support surface and the conveyor.

26. An apparatus as set forth in claim 21, including two pusher plates.

27. An apparatus as set forth in claim 22, wherein the compartments are defined by a plurality of fingers extending from the shuttle plate in a direction transverse to the conveyor.

28. An apparatus for transferring a plurality of containers from a support surface to a continuously moving conveyor located adjacent to the support surface, comprising:
   a) at least one pusher plate having a face portion, the pusher plate positioned to engage the cartons on the support surface, the pusher plate being movable along an axis extending transverse to the conveyor between a retracted position distal from the conveyor and an extended position proximal to the conveyor;
   b) first means for moving the pusher plate between its retracted and extended positions to simultaneously push a plurality of the containers from the support surface and onto the conveyor;
   c) a shuttle plate having a plurality of compartments arranged to receive the containers as they are loaded onto the conveyor by the pusher means, the shuttle plate being movable along first axis running parallel to the conveyor between a first position opposite the pusher plate and a second position downstream of the pusher plate, the shuttle plate also being movable along a second axis running perpendicular to the conveyor between an extended position at which the shuttle plate is positioned above the conveyor and a retracted position at which the shuttle plate is laterally spaced from the conveyor on the side opposite the pusher plate; and
   d) second means for moving the shuttle plate along its first and second axis in accordance with a predetermined sequence to accelerate the cartons along the face portion and the conveyor until the cartons are traveling at approximately the same speed as the conveyor.

29. An apparatus as set forth in claim 28, wherein the first means comprises a pneumatic cylinder connected to move the pusher plate between its extended and retracted positions.

30. An apparatus as set forth in claim 29, wherein the first means further comprises a programmable electronic control connected to control operation of the pneumatic cylinder.

31. An apparatus as set forth in claim 28 wherein the second means comprises:
   a) at least one guide rail extending parallel to the first axis;
   b) a carrier assembly slidably mounted on the guide rail form movement along the first axis;
   c) a second pneumatic cylinder mounted on the carrier assembly for movement therewith, the second pneumatic cylinder being connected to the move shuttle plate along the second axis, between the extended and retracted positions; and
   d) a third pneumatic cylinder connected to the carrier assembly to move the carrier assembly along the first axis, between the first and second positions.

32. An apparatus as set forth in claim 31, further comprising a programmable electronic control connected to control operation of the pneumatic cylinders.

33. An apparatus as set forth in claim 32, further comprising means for detecting an obstruction during transfer between the support surface and the conveyor.

* * * * *

UNITED STATES PATENT AND TRADEMARK OFFICE
CERTIFICATE OF CORRECTION

PATENT NO.:      5,560,471
ISSUED:          October 1, 1996
INVENTOR(S):     Richard Prochut, Doug Sarrazine, Sr.

It is certified that errors appear in the above-identified patent and that said Letters Patent is hereby corrected as shown below:

IN COLUMN 2, LINE 14

Cancel "from" and insert --front-- therefor.

IN COLUMN 8, LINE 9

Cancel "7" and insert --9-- therefor.

Signed and Sealed this

Eleventh Day of February, 1997

Attest:

BRUCE LEHMAN

Attesting Officer

*Commissioner of Patents and Trademarks*